United States Patent [19]

Wang et al.

[11] 4,192,794

[45] Mar. 11, 1980

[54] TITANIUM DIOXIDE-PIGMENTED POLYMER COMPOSITIONS HAVING IMPROVED VISIBLE AND ULTRAVIOLET LIGHT STABILITY

[75] Inventors: Richard H. S. Wang; Gether Irick, Jr.; James C. Ownby, all of Kingsport, Tenn.

[73] Assignee: Eastman Kodak Company, Rochester, N.Y.

[21] Appl. No.: 874,972

[22] Filed: Feb. 3, 1978

[51] Int. Cl.$^2$ .......................... C08K 5/09; C08K 5/27
[52] U.S. Cl. ................. 260/42.45; 260/23 H; 260/42.44; 260/45.85 B
[58] Field of Search .................. 260/42.45, 42.44, 762, 260/234 H, 45.85 B; 106/193 J, 182

[56] References Cited

U.S. PATENT DOCUMENTS

| | | | |
|---|---|---|---|
| 3,189,630 | 6/1965 | Smutny | 260/23 H |
| 3,511,802 | 5/1970 | Newland et al. | 260/42.45 |
| 3,900,442 | 8/1975 | Zannucci et al. | 260/42.46 |
| 3,954,708 | 5/1976 | Rasberger et al. | 260/45.85 B |
| 3,971,755 | 7/1976 | Salvatore et al. | 106/182 |
| 4,011,196 | 3/1977 | Carevic et al. | 260/45.85 B |
| 4,022,632 | 5/1977 | Newland et al. | 106/193 J |
| 4,075,146 | 2/1978 | Kiss | 260/45.85 B |
| 4,075,147 | 2/1978 | Thompson | 260/23 H |

OTHER PUBLICATIONS

Solvik et al., Modern Plastics, Jan. 1974, pp. 78–81.

*Primary Examiner*—Ronald W. Griffin
*Attorney, Agent, or Firm*—Clyde L. Tootle; Daniel B. Reece, III

[57] ABSTRACT

The combination of a zinc salt of a carboxylic acid and a phenolic ultraviolet stabilizer provides a highly effective ultraviolet stabilizer system for TiO$_2$-pigmented polymeric compositions.

8 Claims, No Drawings

TITANIUM DIOXIDE-PIGMENTED POLYMER COMPOSITIONS HAVING IMPROVED VISIBLE AND ULTRAVIOLET LIGHT STABILITY

This invention relates to the ultraviolet light stabilization of polymer compositions, and more particularly to the ulraviolet light stabilization of titanium dioxide-pigmented polymer compositions.

Plastic compositions, such as polypropylene, have found wide acceptance as useful materials for making foils, fibers and molded articles. These formed articles are inherently strong, can be made dimensionally stable or sufficiently flexible to suit the requirements of their intended use, and are relatively inert to common household cleansing agents and solvents. However, such articles are unfortunately subject to rapid and severe degradation and deterioration, as evidenced by changes in the physical properties of the polymers, when subjected to the effects of sunlight, and particularly ultraviolet light. Such photodegradation is particularly evidenced by surface cracking, increased brittleness, loss of dielectric properties and discoloration of the polymer. Polymer compositions which contain titanium dioxide pigment are more difficult to stabilize against such photodegradation than are the unpigmented polymers. For example, an ultraviolet stable polyolefin containing an ultraviolet stabilizer may become destablized by the addition of titanium dioxide. Moreover, the addition of the usual ultraviolet absorbers to such pigmented polyolefin formulations generally provides little or no improvement of this ultraviolet instability. For example, an unpigmented polypropylene film (5-mils thick) containing 0.5% of 4-(dodecyloxy)-2-hydroxybenzophenone or 0.5% 2-(2H-benzotriazol-2-yl)-4,6-di-tert-pentylphenol will have a lifetime to embrittlement of approximately 2000 hours (irradiated with 310 nm and 366 nm) in a Uvatest apparatus (GEOPAR Industries) with an air temperature of 63° C.). However, the addition of 5% of titanium dioxide (Ti-Pure ® R-100) to these compositions will decrease the lifetime to embrittlement to 300 hours; films without the ultraviolet absorber also have lifetimes to embrittlement of 300 hours.

Therefore, while there are many additives, stabilizers and mixtures thereof which are known in the art to improve the ultraviolet light stability of organic compositions, there is a need in the art for more efficient and effective ultraviolet stabilizers to prevent the photodegradation of titanium dioxide containing polymeric compositions, particularly polyolefin compositions. Therefore, to provide a more effective and efficient ultraviolet stabilizer for such titanium dioxide pigmented compositions would be an advance in the state of the art.

It is therefore an object of the present invention to provide more effective and efficient ultraviolet stabilized polymeric compositions.

Another object of this invention is to provide more effective and efficient ultraviolet stabilized pigmented polymeric compositions.

A still further object of the invention is to provide more effective and efficient ultraviolet light stabilized titanium dioxide pigmented polymeric compositions.

Further objectives and advantages of the invention will be apparent to those skilled in the art from the accompanying disclosure and claims.

In accordance with the present invention, there is provided a titanium dioxide-pigmented polymeric composition normally susceptible to degradation due to visible or ultraviolet light comprising A. a stabilizing amount of a zinc salt of a carboxylic acid having the formula

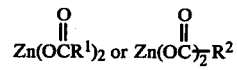

wherein $R^1$ is a branched or unbranched alkyl group having 1 to 20 carbon atoms, or an aryl group with or without substituents; and $R^2$ is a branched or unbranched alkylene having 1 to 12 carbon atoms, or and arylene group with or without substituents; and B. a stabilizing amount of a phenolic ultraviolet stabilizer such as 2,4-di-tert-butylphenyl 3,5-di-tert-butyl-4-hydroxybenzoate (Ferro AM-340, Borg Warner), 2,6-bis(2-hydroxy-3-tert-butyl-5-methylbenzyl)-4-methylphenol, bis[2-hydroxy-3-(1-methylcyclohexyl)-5-methylphenyl)methane and bis(2-methyl-5-tert-butyl-4-hydroxyphenyl)sulfide.

The titanium dioxide-pigmented polymeric compositions normally susceptible to ultraviolet light degradation include, for example, pigmented polymeric compositions such as polyester fiber and moldable compositions, such, for example, as poly(ethylene terephthalate), poly(tetramethylene terephthalate), unsaturated polyester resins, copolyesters and the like; polyolefins such as, for example, high, medium and low density polyethylene, polypropylene, polybutene and the like; polyamides such as N-methoxymethyl poly(hexamethylene adipamide) and the like; vinylidene chloride copolymers such as vinylidene chloride/vinyl acetate copolymers; polycarbonates; poly(vinyl chloride); cellulose esters; acrylic/butadiene/styrene plastic; ethylene/vinyl acetate copolymers; cellulose esters such as methyl cellulose; polyacrylics such as methyl methacrylate; poly(ethylene oxide); poly(vinyl acetals); polyurethanes; polyformaldehydes; polystyrenes and gelatin. Such compositions also include natural and synthetic rubbers such as polybutadiene, and unsaturated organic compositions such as waxes and the like, as well as compositions containing such organic compositions.

In a preferred embodiment of this invention the titanium dioxide-pigmented polymer is a polyolefin, and particularly a propylene containing polyolefin such as polypropylene or a polypropylene having grafted thereto acylic acid or maleic anhydride or acid. Such titanium dioxide-pigmented polyolefins include those polymers prepared by (1) polymerizing propylene, (2) first polymerizing propylene and then a mixture of α-monoolefins containing 2 to 12 carbon atoms to form a block copolymer, (3) polymerizing first propylene and then a diolefin such as isoprene, butadiene and substituted butadiene, and (4) reacting acrylic acid or maleic acid or maleic anhydride with one of the polymers made according to (1), (2) or (3). These polyolefin compositions may then be pigmented with titanium dioxide, generally in an amount of from 0.05% to about 50% based on the weight of the polymer. The preferred amount of titanium dioxide used in a molding composition is about 0.5 to 10%, in a fiber forming composition in an amount of 0.1 to 2% and in a coating composition in an amount of about 5 to 30%.

The methods of pigmenting these polymers are well known in the art and can be accomplished in the same manner as used for adding the zinc-containing ultraviolet stabilizer additives to the pigmented composition. Such methods include melt blending in conventional mixers or extruders.

The zinc salts of carboxylic acids provide substantially no synergism to phenolic ultraviolet stabilizers in the photostability of polymeric compositions which do not contain titanium dioxide. Moreover, the salts provide substantially no synergism to phenolic antioxidants such as tetrakis[3-(3,5-di-tert-butyl-4-hydroxyphenyl)-propionyloxymethyl]methane or benzotriazolyl ultraviolet stabilizers such as 2-(2H-benzotriazol-2-yl)-4,6-di-tert-pentylphenol in the photostability of polymeric compositions containing titanium dioxide. Moreover, this unique stabilization is unexpected and unobvious since other metal salts of similar structure have little effect on the photostability of titanium dioxide-pigmented polyolefins.

The ultraviolet stabilized polymeric compositions produced in accordance with this invention can be prepared by dissolving the salt additive component in a suitable dispersant and coating particles of the titanium dioxide pigmented-polymeric composition with the dispersed salt or solution followed by drying so as to remove the solvent. The stabilizer containing particles are useful for the manufacture of shaped objects such as fibers, films, rods, tubes, molded objects, and the like. Another method for preparing the stabilized polymeric compositions of this invention comprises mixing the salt additive into the polymer on hot mill rolls or in an extruder or a similar device. The melt polymeric composition and salt additive can then be extruded into a shaped object such as fibers or films, or other molded objects. Alternatively, the milled or extruded polymeric composition can be granulated and used for injection molding. Other methods for incorporating the salt additive into polymers are apparent to those skilled in the art.

The amount of the salt additive component which can be employed depends upon the degree of stability desired. For example, about 5% by weight of the salt additive, based on the weight of the polymer, would be the maximum required for preventing degradation of the polymers under the most severe conditions. In some instances as little as 0.1% of the zinc salt will be effective to prevent ultraviolet and visible light degradation where the finished article is not subjected to a great amount of ultraviolet light.

Examples of suitable zinc salts useful in the invention are the zinc salts of acetic acid, benzoic acid, propionic acid, succinic acid, adipic acid, terephthalic acid, isophthalic acid and naphthalenecarboxylic acid.

The ultraviolet stabilized organic compositions of the present invention may also contain other additives, pigments, colorants, stabilizers, nucleation agents, and the like. For example, titanium dioxide pigmented polymeric compositions, such as polyolefins, may also contain and generally do contain other additives such as antioxidants, plasticizers, flow aids, processing aids, polymeric modifiers and the like.

This invention will be further illustrated by the following examples, although it will be understood that these examples are included merely for purposes of illustration and are not intended to limit the scope of the invention.

EXAMPLE 1

Evaluation of zinc benzoate as synergist to phenolic stabilizers in TiO$_2$-pigmented polypropylene: The formulations containing 5% TiO$_2$ (Ti-Pure ® R-100) were prepared by dry-blending the components, milling on an open two-roll mill and pressing films of 5-mil thickness. Films were then weathered in a Uvatest apparatus (GEOPAR Industries) until embrittlement.

Table 1

| Effectiveness of Zinc Benzoate as Synergist to Phenolic Stabilizers | |
|---|---|
| Compounds (wt %) | Hours to Embrittlement |
| 1. None | 200 |
| 2. Zn(OBz)$_2$ (0.5) | 720 |
| 3. Irganox 1010 (0.5) | 1000 |
| 4. Ferro Am-340 (0.5) | 1000 |
| 5. 2 + 3 | 1070 |
| 6. 2 + 4 | 1850 |

Thus, the unique effect of the combination of zinc benzoate and Ferro AM-340 is readily observable.

EXAMPLE 2

Evaluation of metal salts of carboxylic acid as synergists to phenolic ultraviolet stabilizers in TiO$_2$-pigmented polypropylene. The 5-mil film samples were prepared and evaluated as described in Example 1.

Table 2

| Effectiveness of Metal Salts as Synergist to Ultraviolet Stabilizers | |
|---|---|
| Compounds (wt %) | Hours to Embrittlement |
| 1. None | 300 |
| 2. Ferro AM-340 (0.5) | 1400 |
| 3. Tinuvin 328 (0.5) | 300 |
| 4. 2 + Zn(OBz)$_2$ (0.5) | 2500 |
| 5. 2 + Zn(OAc)$_2$ (0.5) | 2500 |
| 6. 2 + Zn salicylate (0.5) | 1400 |
| 7. 2 + Ni(OBz)$_2$ (0.5) | 1200 |
| 8. 2 + Ni(OAc)$_2$ (0.5) | 1500 |
| 9. 2 + Ce(OBz)$_3$ (0.5) | 1500 |
| 10. 2 + Ce(OAc)$_3$ (0.5) | 1700 |
| 11. 2 + Mn(OBz)$_2$ (0.5) | 1500 |
| 12. 2 + NaOBz (0.5) | 1500 |
| 13. 3 + Zn(OBz)$_2$ (0.5) | 900 |

The unique effect of the zinc salts of this invention relative to other metal salts is apparent from items 4 and 5 above.

Although the invention has been described in considerable detail with particular reference to certain preferred embodiments thereof, variations and modifications can be effected within the spirit and scope of the invention.

We claim:

1. An ultraviolet light stabilized pigmented polyolefin polymeric composition comprising (1) a polyolefin polymeric composition normally susceptible to degradation due to visible or ultraviolet light, (2) titanium dioxide, (3) a phenolic ultraviolet stablizer and (4) 0.1 to 5 percent of a zinc salt of a carboxylic acid having the formula:

$$Zn(OCR')_2$$

wherein R' is an alkyl group having 1 to 20 carbon atoms or an aryl group.

2. An ultraviolet light stabilized pigmented composition according to claim 1 wherein R' is methyl, ethyl, or phenyl.

3. An ultraviolet light stabilized pigmented composition of claim 1 wherein the polyolefin is polypropylene.

4. An ultraviolet light stabilized pigmented composition of claim 1 wherein the polyolefin is a polypropylene graft acrylic acid.

5. An ultraviolet light stabilized pigmented composition according to claim 1 wherein said phenolic ultraviolet stabilizer is 2,4-di-tert-butylphenyl 3,5-di-tert-butyl-4-hydroxybenzoate, 2,6-bis(2-hydroxy-3-tert-butyl-5-methylbenzyl)-4-methylphenol, bis[2-hydroxy-3-(1-methylcyclohexyl)-5-methyl-phenyl)methane], or bis(2-methyl-5-tert-butyl-4-hydroxyphenyl)-sulfide).

6. An ultraviolet light stabilized pigmented composition according to claim 5 wherein the polymeric composition is polypropylene.

7. An ultraviolet light stabilized pigmented composition according to claim 6 wherein the zinc salt is zinc benzoate.

8. An ultraviolet light stabilized pigmented composition according to claim 6 wherein the zinc salt is zinc acetate.

* * * * *